United States Patent
Howard et al.

[11] Patent Number: 5,929,868
[45] Date of Patent: *Jul. 27, 1999

[54] METHOD AND APPARATUS FOR COMPUTER DISPLAY MEMORY MANAGEMENT

[75] Inventors: Brian D. Howard, Menlo Park; Robert L. Bailey, San Jose, both of Calif.

[73] Assignee: Apple Computer, Inc., Cupertino, Calif.

[ * ] Notice: This patent is subject to a terminal disclaimer.

[21] Appl. No.: 08/722,543

[22] Filed: Sep. 27, 1996

[51] Int. Cl.$^6$ .................................................. G09G 5/00
[52] U.S. Cl. ............................... 345/508; 345/509; 345/1
[58] Field of Search .................................... 345/508, 509, 345/507, 510, 515, 511, 512, 1, 3, 132, 501, 521; 711/100, 152, 157

[56] References Cited

U.S. PATENT DOCUMENTS

| | | | |
|---|---|---|---|
| 4,914,607 | 4/1990 | Takanashi et al. | 345/344 |
| 4,918,429 | 4/1990 | Clarke | 345/203 |
| 5,357,606 | 10/1994 | Adams | 345/201 |
| 5,448,264 | 9/1995 | Pinedo et al. | 345/201 |
| 5,587,726 | 12/1996 | Moffat | 345/201 |
| 5,608,427 | 3/1997 | Hoffert et al. | 345/201 |
| 5,625,386 | 4/1997 | Howard et al. | 345/201 |

*Primary Examiner*—Lun-Yi Lao
*Attorney, Agent, or Firm*—Richard C. Liu

[57] ABSTRACT

A method and an apparatus for interleaving display frame buffers is disclosed. The system includes a processor providing CPU addresses for peripheral (access, a display system, a single memory system for storing multiple frame buffers, data buses for transferring image information and a video controller for processing the image information received and for converting CPU addresses into memory addresses for accessing the memory system. The multiple frame buffers stored in the memory system in accordance with the present invention provide either overlay images for a display or separate images for separate displays or both.

18 Claims, 7 Drawing Sheets

640x480 x    1bt/pxl    =    38,400 bytes

640x480 x    2bts/pxl   =    76,800 bytes

640x480 x    4bts/pxl   =    153,600 bytes

640x480 x    8bts/pxl   =    307,200 bytes

640x480 x    16bts/pxl  =    614,400 bytes

640x480 x    24bts/pxl  =    921,600 bytes

640x480 x    32bts/pxl  =  1,228,800 bytes

FIG. 1A 2 x 128Kx8    =    262,144 bytes
or  1 x 128Kx16

2 x 256Kx8    =    524,288 bytes
or  1 x 256Kx16

2 x 512Kx8    =  1,048,576 bytes
or  1 x 512Kx16

4 x 128Kx8    =    524,288 bytes
or  2 x 128Kx16

4 x 256Kx8    =  1,048,576 bytes
or  2 x 256Kx16

4 x 512Kx8    =  2,097,152 bytes
or  2 x 512Kx16

FIG. 1B

Buffer A stores 4 bits/pixel, Buffer B stores 8 bits/pixel

Both buffers store 8 bits/pixel

Buffer A stores 4 bits/pixel, Buffer B stores 16 bits/pixel

METHOD AND APPARATUS FOR COMPUTER DISPLAY MEMORY MANAGEMENT

FIELD OF THE INVENTION

This invention relates generally to a processor-controlled system such as a computer system and, more particularly, but not exclusively, to an electrical arrangement in the system for managing video information for displaying such information on associated display monitor(s).

BACKGROUND INFORMATION

It is often the case that the image data for a computer graphics display does not fit very efficiently into the standard sizes of memory components. For example, among the many image resolutions for computer displays in the market today, a common resolution for computer displays is 640×480. Such resolution for a display refers to a display having an overall screen measuring 640 pixels wide by 480 lines high. But a frame buffer of video information servicing this display at typical bit-per-pixel rates fits very inefficiently into any standard sizes of memory components, leaving large amounts of memory unused. As an illustration, referring to the frame buffer and memory size tables shown in FIGS. 1A and 1B, a 640×480 display at 16 bits per pixel requires 614,400 bytes to store its data, but the smallest memory size available for such a frame buffer is 1,048,576 bytes. This leaves 434,176 bytes of memory unused, enough to store a second 640×480 frame buffer at 8 bits per pixel.

Processor-controlled systems including an image display often have needs for more than one frame buffer in order to store additional image information from sources such as live TV video or a pen input device, allowing overlaying (or underlaying) any such external image(s) onto the normal display image. Additional frame buffers are also used in systems where there are at least two different image displays, e.g., a built-in LCD display and an external CRT monitor. For these systems operatively associating with more than one frame buffer possibly from multiple sources, the above-mentioned memory management inefficiency could be cured by appropriately storing the more than one frame buffer into a video memory system having multiple memory components, e.g., VRAMs or DRAMs.

On the one hand, VRAM is dual-ported in that image data used to refresh the display(s) are clocked out of one data port while the processor, e.g., CPU, updates the image data through another port of the VRAM. On the other hand, image data in DRAM are accessed for refresh and updates via a single port. In fact, the embodiments disclosed hereinafter are better adapted for VITAM usage but the invention can be easily re-configured by an artisan to use other types of memory including DRAM.

One implementation for managing more than one frame buffer is a video memory system using VRAM accessed by an associated CPU over a 16-bit bus, and by a video controller over a 32-bit serial data bus. This implementation treats the two 16-bit halves of the 32-bit VRAM as two separate 16-bit VRAM banks, independently accessible by the CPU over the same 16-bit data bus (separate RAS/ signals to the two VRAM banks making this possible), and independently accessible by the video controller over the two 16-bit halves of the 32-bit serial data bus (separate output clock signals to the two VRAM banks making this possible). Under this implementation, the CPU stores a first logical frame buffer into a first VRAM bank and a second logical frame buffer into a VRAM bank other than the first VRAM bank. The video controller then accesses the two logical frame buffers separately because each 16-bit half of the 32-bit serial port for VRAM data output is independently clocked. As demonstrated in FIG. 2, when logical frame buffers A and B are both stored into the memory system at the same 16 bits-per-pixel rate, using pixels from each VRAM bank at the same rate means using the data bits at the same rate, so the video controller simply clocks the 32-bit VRAM data bus port of the two VRAM banks simultaneously and the full 16 bits of each VRAM output port would be clocked once for each display pixel. Unfortunately, when using this implementation, neither frame buffer is to be larger than the maximum size that can be stored in one bank of VRAM (i.e., no larger than on half the maximum size storable in the combined banks if used as one memory). This restriction means that considerable VRAM cells remains unused, or it means that the addition of an overlay buffer reduces the maximum bits per pixel rate for the display by half.

SUMMARY OF THE INVENTION

It would be desirable and therefore an object for the present invention to store multiple overlaying images in a video memory system having multiple memory components, e.g., VRAMs, or a system of DRAMs, wherein the frame buffers are more efficiently stored (e.g., According to the above implementation, a frame buffer of larger than half the maximum memory size could be stored.) and wherein the multiple sets of image data are to be accessed "simultaneously" in a data stream from that memory system. One aspect of the invention includes a system wherein portions of a first frame buffer are stored in all of the memory components, e.g. VRAM banks, of a memory system, and portions of a second frame buffer to be overlaid onto the display image are stored in the same memory components using otherwise unused memory cells. Instead of overlaying the two image frame buffers onto a single display, it is yet a further object for said image display system to concurrently display images from the two frame buffers onto separate displays. Another aspect of the present invention includes an arrangement for manipulating the addressing of the memory system on data reads and writes, such that the two frame buffers are made to appear individually separate and distinct to software, but the image data from the two logical frame buffers are distributed in the physical memory so the streams of data from the two logical frame buffers arrive correctly when accessed sequentially by the video display controller. The video display controller functions as a memory address controller that takes in a contiguous range of CPU addresses used for accessing the logical frame buffers and converts those addresses to the appropriate memory addresses for accessing the physical memory.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A is a table listing frame buffer size requirements for a 640×480 display at varying bit-per-pixel rates;

FIG. 1B is a table listing common VRAM memory sizes;

DESCRIPTION OF EMBODIMENTS

A novel method and apparatus are described for arranging two logical frame buffers into a single memory system having two banks of VRAMs for display operations of a computer. The particular electronic implementation of the present invention should not be seen as limiting because the present invention may be suitable for use in any electronically controlled system requiring the use of at least two logical frame buffers for display operations. Throughout this detailed description numerous details are set forth in order to provide a thorough understanding of the present invention, for example, multiple references are made to specific data word bit-widths of communication lines. These specific values are exemplary only. To one skilled in the art, however, it will be appreciated that the present invention may be practiced without such specific details and that a wide range of data-word-bit-width values can be used within the scope of the present invention. In other instances, well-known methods, procedures, control structures and gate level circuits have not been shown in detail in order not to obscure the present invention.

With today's device technology, the development of specialized integrated circuits and programmable logic generally do not require the rendering of fully detailed circuit diagrams. The definition of logic functionality allow computer design techniques to design the desired logic and circuits. Additionally, microcontrollers are known to operate based on a desired flow diagram rendered into software that is compatible with a selected microcontroller. Accordingly, portions of the present invention will be described primarily in terms of functionality to be implemented by a microcontroller and other associated electronic components. This functionality will be described and those of ordinary skill in the art, once given the following descriptions of the various functions to be carried out by the present invention will be able to implement the necessary microcontroller structure and logic for various logic devices or custom designed integrated circuits in suitable technologies without undue experimentation.

Figure 2:
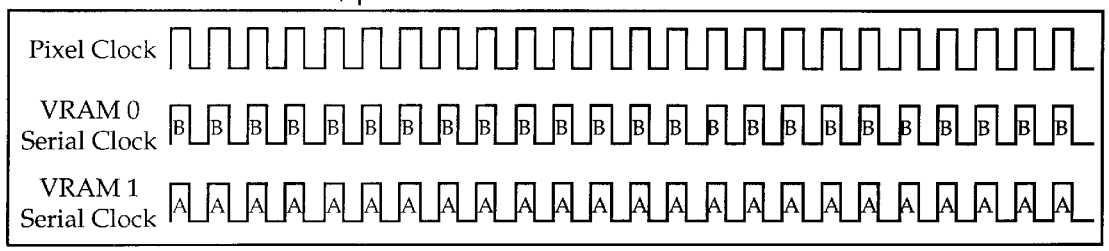
FIG. 2 is a timing diagram illustrating how a pixel clock signal for the display(s) relates to the timing at which the two 16-bit-per-pixel frame buffers A and B are delivered over a 32-bit bus to a video display controller.
Figure 3:
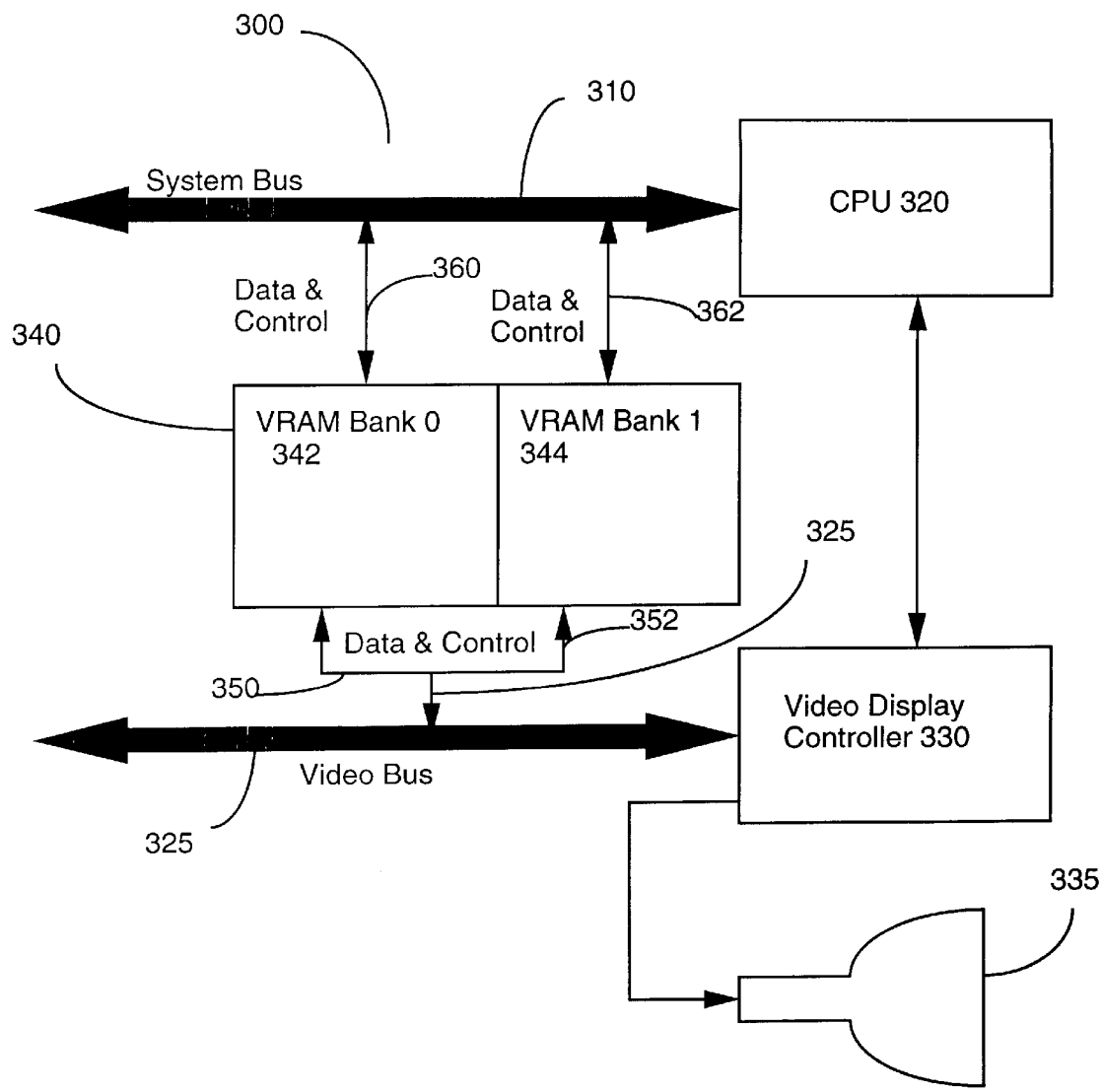
FIG. 3 is a functional diagram illustrating a partial computer system in accordance with the present invention wherein VRAM Banks 0 and 1 reside in a video memory system.

FIG. 3 is a block diagram illustrating a partial computer system 300 in accordance with the present invention. This computer system 300 comprises a system bus 310 and a video bus 325 for carrying information, a CPU 320 coupled to the system bus 310 for processing information and instructions, a video display controller 330 coupled to the video bus 325 for processing image information and for directing the processed image information to an associated display 335, and a video memory system 340 including VRAM Banks 0 and 1 342, 344 operatively storing video or image information including the frame buffers A and B (not shown). This video memory system 340 is coupled to the system bus 310 over paths 360, 362 and the video bus 325 over paths 350, 352 for receiving and dispatching image information respectively, and for receiving and responding to control signals transmitted by the CPU 320 and the vide,o display controller 330. The display 335 utilized with the computer system 300 may be a liquid crystal device, cathode ray tube, or other display devices suitable for creating graphic images and alphanumeric characters recognizable to the user. In fact, the display 335 is generic in that it could represent more than one display.

In accordance with one aspect of the invention, the partial computer system 300 provides an arrangement wherein the frame buffer B is divided into two buffer portions, namely, $B_a$ and $B_b$. And under the control of the CPU 320 over paths 360, 362, they are subsequently stored into VRAM Bank 0 and Bank 1 342, 344, respectively. The two buffer portions $B_a$, $B_b$ collectively may have a size larger than the maximum size of either VRAM Bank 342 or 344 thus providing an advantage over the existing implementation. Because the frame buffer B is stored partly in the VRAM Bank 0, 342 and partly in the VIZAM Bank 1, 344, the video display controller 330 accesses the frame buffer B either over paths 350,325 or paths 352,325.

To increase the speed in which image information is retrieved from both Banks, one aspect of the invention discloses that any additional frame buffer such as the frame buffer A must also divide its data into portions $A_a$ and $A_b$, and store them in the unused memory cells of Bank 0 342 and Bank 1 344, respectively, such that during data storage or refresh, $B_a$ and $A_b$ represent the beginning or the first image portions for the frame buffers B and A, respectively, and that $B_b$ and $A_a$ represent the ending or the last image portions for the frame buffers B and A, respectively. For example, when data from the buffer portion $B_a$ is being clocked out of the VRAM Bank 0, 342 over path 350, the data from the buffer portion $A_b$ must be available at the serial output port of the VRAM Bank 1, 344; but when it is time to clock data from the buffer portion $B_b$ out of the VRAM Bank 1, 344, in turn, the corresponding data of the buffer portion $A_a$ must be available at the serial output port of the VRAM Bank 0, 342.

Therefore, in order to appropriately access frame buffer B, the video display controller 330 strobes VRAM Bank 342 over path 350 when accessing data in buffer portion $B_a$, or strobes VRAM Bank 344 over path 352 when accessing data in buffer portion $B_b$. At the same time, image data from the frame buffer A (buffer portions $A_a$, $A_b$) must be accessed through a VRAM bank output port different from the VRAM bank output port used for accessing data of the frame buffer B. Furthermore, depending on the respective bit per pixel rates for the frame buffers A and B, the clock rates preferably used by the video display controller 330 for accessing the two frame buffers may not be the same.

Figure 4A:
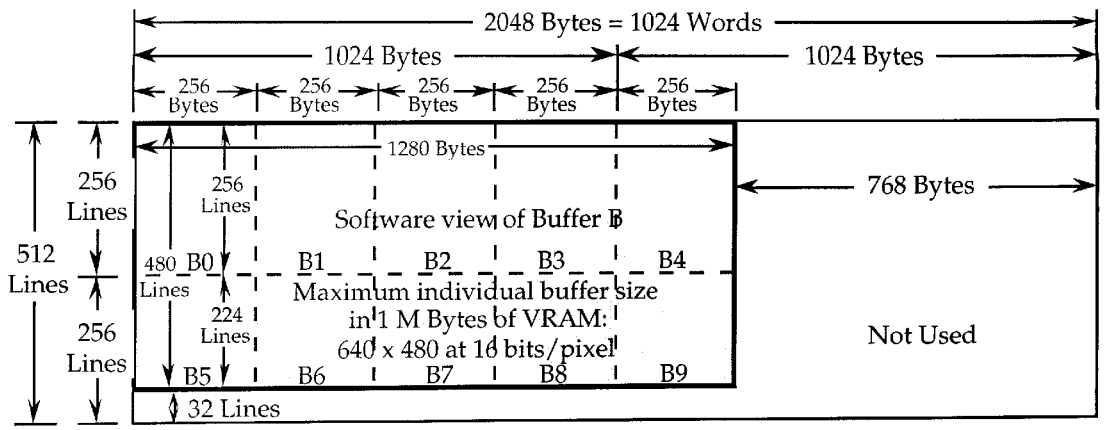
FIG. 4A illustrates how a 16-bit-per-pixel frame buffer B with trailing unused memory bytes for a 640×480 display is viewed by software.
Figure 4B:
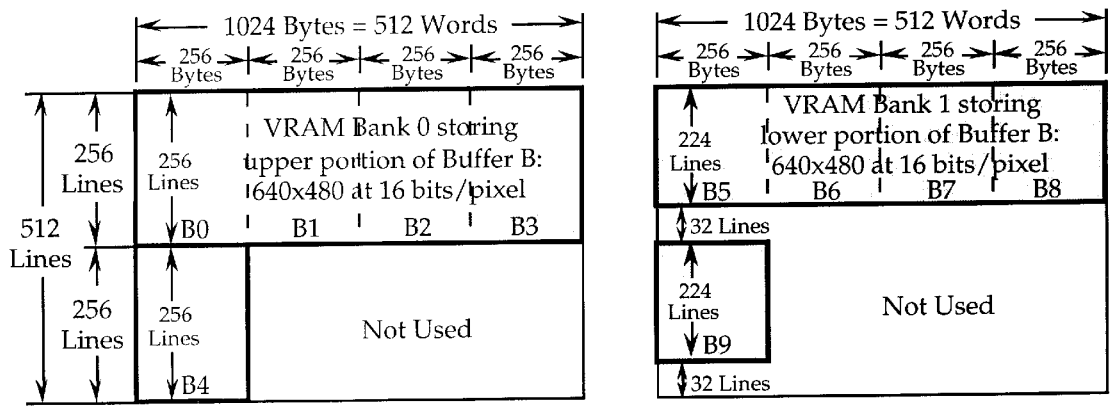
FIG. 4B illustrates how the 16-bit-per-pixel frame buffer B is physically stored in the VRAM Banks 0 and 1 in the video memory system in accordance with the present invention.

FIG. 4A illustrates the software view of a frame buffer B at 16 bits per pixel for a 640×480 display in one embodiment in accordance with the present invention. The frame buffer B (600 K bytes) in this embodiment being larger than half of the maximum size (1 M bytes) of the total memory. And to a system user, it is viewed as being contiguously and integrally stored although in this embodiment, the memory system includes two 512 K byte banks of VRAM (1 M byte total memory) wherein each bank consists of one 256 K×16 VRAM addressed 9 Rows×9 Columns. In fact, FIG. 4B shows how the same frame buffer B would be actually stored in the above two banks of VRAM in two data portions where B0–B4 correspond to $B_a$ and B5–B9 correspond to $B_b$.

The addressing of the data of the frame buffer B by the CPU 320 can be broken into three parts, namely, row (line) addressing, column (word) addressing and byte addressing. For a typical 20-bit CPU address, the bits are correspondingly broken down in the following manner:

| Address Type | Bit Position | Comment |
| --- | --- | --- |
| CPU Row Address: | A19-11 | (512 Rows = 9 bits) |
| CPU Column Address: | A10-1 | (1024 words = 10 bits) |
| CPU Byte Address: | A0 | (2 bytes/word = 1 bit). |

A user looking at the buffer frame B using the CPU addresses would believe the frame buffer is contiguously and integrally stored. However, in order to practice the present invention, one implementation requires the above 20-bit CPU addresses to be transformed into VRAM addresses for appropriately accessing the buffer frame B.

The VRAM addressing for Buffer B is as follows:

VRAM Row Address=eight LSB's of CPU Row Address (A18-11)+256*MSB of CPU Column Address (A10);

VRAM Column Address=nine LSB's (A9-1) of CPU Column Address;

VRAM Bank 1/0 select bit=MSB of CPU Row Address (A19) (Select Bank 0 when A19=0);

VRAM Byte Address=CPU Byte Address;
   where MSB is the most significant bit(s) and LSB is the least significant bit(s).

Depending on relevant parameters such as display resolution, video memory bank constraints and frame buffer sizes, other transformation equations can be developed without undue experimentation for practicing the present invention. In view of the present implementation, however, the above equations can be best understood by referencing FIGS. 4A and 4B. As to the VRAM Row Address, all those data words having CPU column addresses of less than 512 (see B0, B1, B2 & B3) will retain the same CPU row addresses, but all those data words (see B4) having CPU column addresses of more than 512 will have their CPU row addresses incremented by 256. As to the VRAM Column Address, similar to the above discussion, all those data words having CPU column addresses of less than 512 will retain the same CPU Column Addresses, but in the case where data words have CPU column addresses of more than 512, their column addresses will all be decremented by 512. In other words, these address transformation equations will wrap around any frame buffer portion (see B4) having column addresses larger than what can be accommodated by the number of columns of the VRAM device used in a given video memory system. Also, in the present implementation where A19, MSB of the CPU Row Address, is used as the Bank 1/0 select bit, data words with CPU row addresses equal to or greater than 256 will be physically divided out and stored in Bank 1, 344. In practice, other threshold(s) may be used to designate one or more memory banks. Lastly, the CPU and VRAM byte addresses for the frame buffers are the same.

Figure 5A:
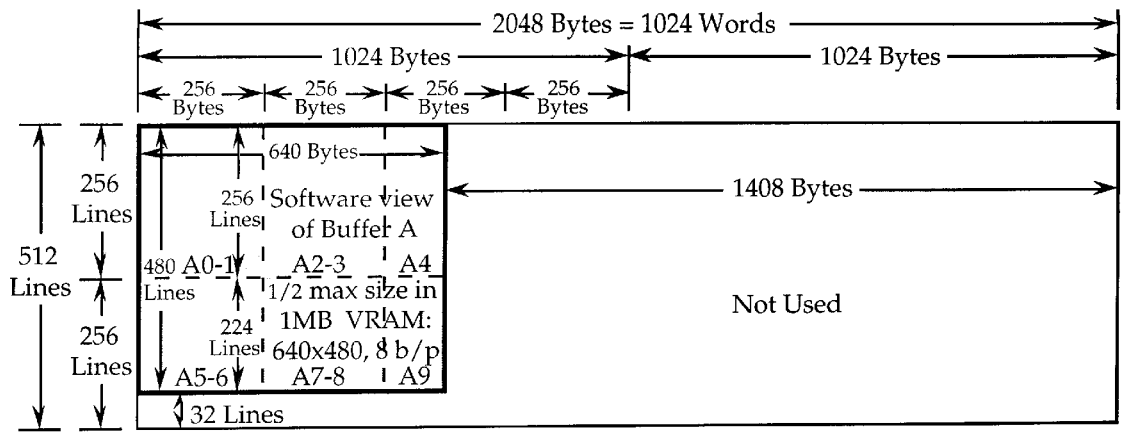
FIG. 5A illustrates how an 8-bit-per-pixel frame buffer A with trailing unused memory bytes for a 640×480 display is viewed by software.
Figure 5B:
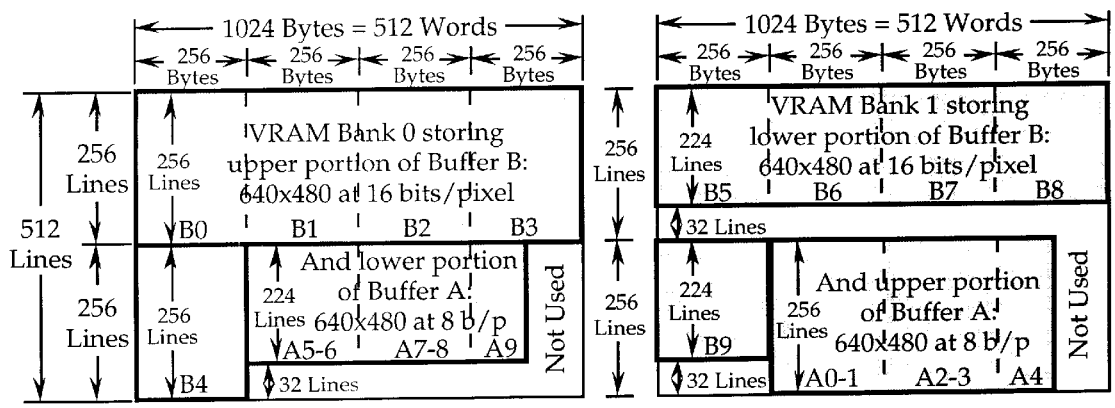
FIG. 5B illustrates how the 16-bit-per-pixel frame buffer B and the 8-bit-per-pixel frame buffer A are physically stored in the VRAM Banks 0 and 1 in accordance with the present invention.

With regard to an additional frame buffer, such as a 8 bits per pixel frame buffer A for the 640×480 display, FIG. 5A shows the software view of the frame buffer A being stored in the 1 M byte VRAM system. But in fact, the frame buffer A together with the frame buffer B would actually be stored in the VRAM system as shown in FIG. 5B. And the address transformation equations having logic similar to the above discussion transforming the CPU addresses of memory cells of the frame buffer A into their corresponding VRAM addresses are as follow:

VRAM Row Address=eight LSB's of CPU Row Address (A18-11)+256;

VRAM Column Address=nine LSB's (A9-1) of CPU Column Address+128;

VRAM Bank 1/0 select bit=inverted MSB of CPU Row Address (A19) (Select Bank 1 when A19=0);

VRAM Byte Address=CPU Byte Address;
   where MSB is the most significant bit(s) and LSB is the least significant bit(s).

Figure 6:
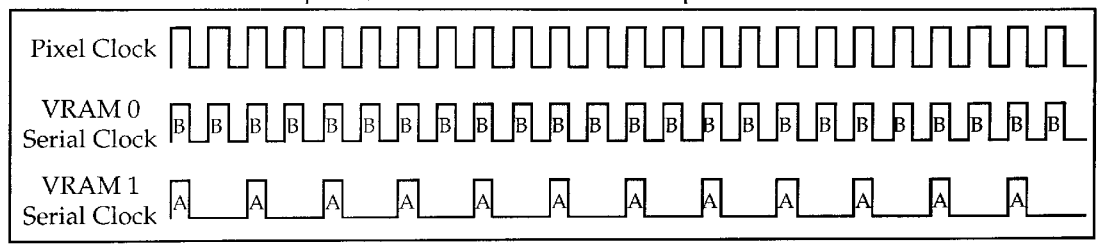
FIG. 6 is a timing diagram illustrating how a pixel clock signal for the display(s) relates to the timing at which the image data is delivered over a 32-bit bus to the video display controller of FIG. 3 for an embodiment having an 8-bit-per-pixel frame buffer A and a 16-bit-per-pixel frame buffer B.
Figure 7A:
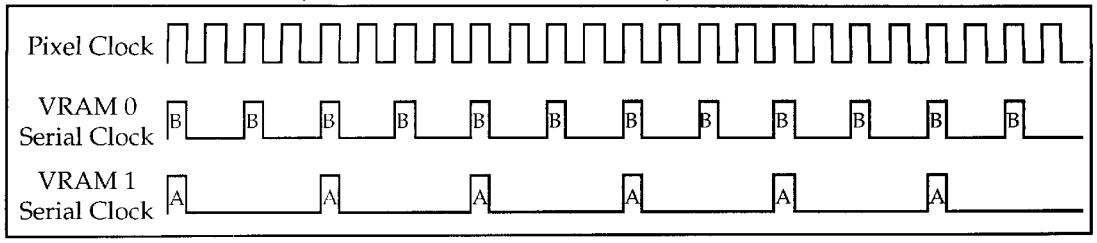
FIG. 7A is a timing diagram illustrating how a pixel clock signal for the display(s) relates to the timing at which the image data is delivered over a 32-bit bus to the video display controller of FIG. 3 for an embodiment having a 4-bit-per-pixel frame buffer A and an 8-bit-per-pixel frame buffer B.
Figure 7B:
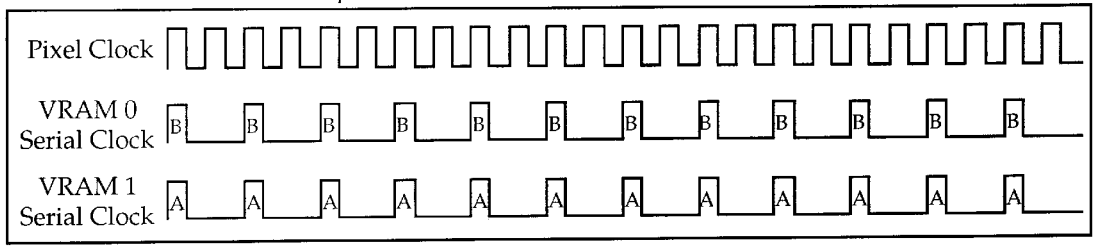
FIG. 7B is a timing diagram illustrating how a pixel clock signal for the display(s) relates to the timing at which the image data is delivered offer a 32-bit bus to the video display controller of FIG. 3 for an embodiment having both frame buffers A and B operatively stored at an 8-bit-per-pixel rate.
Figure 7C:
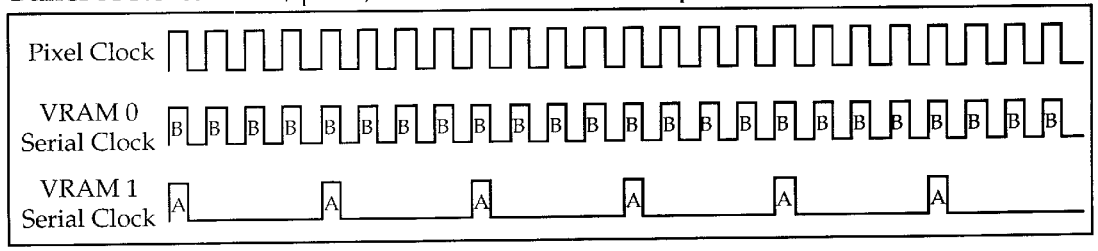
FIG. 7C is a timing diagram illustrating how a pixel clock signal for the display(s) relates to the timing at which the image data is delivered over a 32-bit bus to the video display controller of FIG. 3 for an embodiment having a 4-bit-per-pixel frame buffer A and a 16-bit-per-pixel frame buffer B.

As shown in FIG. 5B, the video display controller 330 for display or refresh would clock the upper 256 lines of data from the buffer portion $B_a$ out of the VRAM Bank 0, 342 and the corresponding upper 256 lines of data from the buffer portion $A_b$ out of the VRAM Bank 1, 344 in a manner as indicated by FIG. 6. Subsequently, the video display controller 330 would appropriately clock the remaining lower 240 lines of data from the frame buffers A and B out of their respective VRAM Banks. One advantage of this implementation, as shown in FIGS. 7A, 7B, 7C, is that it can be used for frame buffer pixel data stored at combinations of any number of bits per pixel rate such that the combined frame buffer size does not exceed the memory available, in the instant case, for a 1 M byte memory and a 640×480 display, the maximum rates for the two frame buffers are 16 bits per pixel and 8 bits per pixel. Another advantage of this implementation is that it can be used for a single frame buffer when this buffer is up to the maximum size that will fit in the combined memory of both VRAM Banks. In addition, as shown in FIGS. 6, 7A, 7B and 7C, the clocking of the video data stored in each VRAM Bank is independent of each other. Each serial output port clock is appropriately adjusted to the rate at which data from its respective VRAM Bank is needed. In other implementations, the two streams of serial output port data may be used to support two different displays, rather than overlaid frame buffers for one display. Under those implementations, the clocking of the two serial output ports might even be completely asynchronous, each corresponding to the timing needs of the display or other data-consuming device serviced by its respective VRAM Bank.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A computer system including a processor and a display system, said display system comprising:

a display means for displaying images;

a video bus carrying a sequence of image information consisting of 2y T-bit-wide data words;

a video display controller being coupled to the video bus for receiving the image information and being coupled to the display means for transferring the image information for use by said display means;

a memory system of sufficient size for storing the image information, the memory system being coupled to the video bus for transferring the image information to the video display controller;

at least a first logical frame buffer and a second logical frame buffer containing the image information, and the image information from each frame buffer being carried in separate T-bit data words and the first and the second logical frame buffers having $P_1$ bits per pixel and $P_2$ bits per pixel respectively where $P_2 \geq P_1$, and where 1) $P_2/P_1 = n$, where n is a number ranging from 1 to T and where 2y = n where y is an integer;
2) $T \geq P_1$ and $T \geq P_2$;
3) $X_1$ and $X_2$ being integers and are numbers of pixels separately stored in each T-bit data word for the first logical frame buffer and the second logical frame buffer respectively, where $X_1 = T/P_1$ and $X_2 = T/P_2$; and
4) the sequence of the T-bit data words carrying the image information in a repeating pattern such that for each $X_1$ pixels of the first frame buffer carried there is an immediate corresponding $X_2$ pixels of the second frame buffer also being carried by the sequence so that the pattern repeats itself after the transfer of a sum of $X_1 + X_2$ pixels from both logical frame buffers; and the memory system being further arranged such that the two logical frame buffers are stored therein for the simultaneous transfer of the image information from each frame buffer to the video display controller according to at least one data clock rate.

2. The computer system of claim 1 wherein the memory system is further coupled to the processor via a system bus.

3. The computer system of claim 2 wherein the memory system is, physically divided into more than one data bank and each bank stores data words having T bits.

4. The computer system of claim 3 wherein each of the first and second logical frame buffers is physically divided and stored into a first bank and a second bank of the memory system and wherein the video display controller is coupled to the processor and further includes an address generator for receiving CPU addresses of the image information from the processor and for responsively generating their corresponding memory addresses for accessing the two logical frame buffers in the memory system thereby allowing each of the two frame buffers to appear logically to the processor as occupying a contiguous and integral portion of the memory system.

5. The computer system of claim 4 wherein the first logical frame buffer from the first bank while being coupled to the video display controller via the video bus, the second logical frame buffer from the second bank at the approximately same time is being coupled to the video display controller also via the video bus.

6. The computer system of claim 4 wherein the second logical frame buffer from the first bank while being coupled to the video display controller via the video bus, the first logical frame buffer from the second bank at the approximately same time is being coupled to the video display controller also via the video bus.

7. The computer system of claim 1 wherein said display means includes two displays and wherein said video display controller separates said two logical frame buffers into two separate data streams and directs the data streams individually and separately to the two displays.

8. The computer system of claim 1 wherein said video display controller determines the image information of which of the two frame buffers is to be applied to a specific pixel location on said display means.

9. The computer system of claim 1 wherein said memory system includes DRAM.

10. The computer system of claim 1 wherein said memory system includes VRAM.

11. The computer system of claim 1 wherein said at least one data clock rate includes two clock rates being asynchronous to each other.

12. An expansion card for video display control removably attached to a computer system that has a processor and a display means for displaying images, said expansion card comprising:

a video bus carrying a sequence of image information consisting of 2T-bit-wide data words;

a video display controller being coupled to the video bus for receiving the image information and being coupled to the display means for transferring the image information for use by said display means;

a memory system of sufficient size for storing the image information, the memory system being coupled to the video bus for transferring the image information to the video display controller;

at least a first logical frame buffer and a second logical frame buffer containing the image information, and the image information from each frame buffer being carried in separate T-bit data words and the first and the second logical frame buffers having $P_1$ bits per pixel and $P_2$ bits per pixel respectively where $P_2 \geq P_1$, and where 1) $P_2/P_1 = n$, where n is a number ranging from 1 to T and where 2y = n where y is an integer;
2) $T \geq P_1$ and $T \geq P_2$;
3) $X_1$ and $X_2$ being integers and are numbers of pixels separately stored in each T-bit data word for the first logical frame buffer and the second logical frame buffer respectively, where $X_1 = T/P_1$ and $X_2 = T/P_2$; and
4) the sequence of the T-bit data words carrying the image information in a repeating pattern such that for each $X_1$ pixels of the first frame buffer carried there is an immediate corresponding $X_2$ pixels of the second frame buffer also being carried by the sequence so that the pattern repeats itself after the transfer of a sum of $X_1 + X_2$ pixels from both logical frame buffers; and the memory system being further arranged such that the two logical frame buffers are stored therein for the simultaneous transfer of the image information from each frame buffer to the video display controller according to at least one data clock rate.

13. The expansion card of claim 12 wherein the memory system is, further coupled to the processor via a system bus.

14. The expansion card of claim 13 wherein the memory system is physically divided into more than one data bank, and each bank stores data words having T bits.

15. The expansion card of claim 14 wherein each of the first and second logical frame buffers is physically divided and stored into a first bank and a second bank of the memory system and wherein the video display controller is coupled to the processor and further includes an address generator for receiving CPU addresses of the image information from the processor and for responsively generating their corresponding memory addresses for accessing the two logical frame buffers in the memory system thereby allowing each of the two frame buffers to appear logically to the processor as occupying a contiguous and integral portion of the memory system.

16. The expansion card of claim 15 wherein the first logical frame buffer from the first bank while being coupled to the video display controller via the video bus, the second logical frame buffer from the second bank at the approximately same time is being coupled to the video display controller also via the video bus.

17. The expansion card of claim 15 wherein the second logical frame buffer from the first bank while being coupled to the video display controller via the video bus, the first logical frame buffer from the second bank at the approximately same time is being coupled to the video display controller also via the video bus.

18. A method for transferring image data in a computer system that includes a processor and a display system, said method comprising the steps of:

provide a display means for displaying images;

providing a video bus carrying a sequence of image information consisting of 2T-bit- wide data words;

providing a video display controller being coupled to the video bus for receiving the image information and being coupled to the display means for transferring the image information for use by said display means;

providing a memory system of sufficient size for storing the image information, the memory system being coupled to the video bus for transferring the image information to the video display controller;

providing at least a first logical frame buffer and a second logical frame buffer containing the image information, and the image information from each frame buffer being carried in separate T-bit data words and the first and the second logical frame buffers having $P_1$ bits per pixel and $P_2$ bits per pixel respectively where $P_2 \geq P_1$, and where 1) $P_2/P_1=n$, where n is a number ranging from 1 to T and where $2y=n$ where y is an integer;
2) $T \geq P_1$ and $T > P_2$;
3) $X_1$ and $X_2$ being integers and are numbers of pixels separately stored in each T-bit data word for the first logical frame buffer and the second logical frame buffer respectively, where $X_1=T/P_1$ and $X_2=T/P_2$; and
4) the sequence of the T-bit data words carrying the image information in a repeating pattern such that for each $X_1$ pixels of the first frame buffer carried there is an immediate corresponding $X_2$ pixels of the second frame buffer also being carried by the sequence so that the pattern repeats itself after the transfer of a sum of $X_1+X_2$ pixels from both logical frame buffers; and the providing memory system step further including arrangement such that the two logical frame buffers are stored therein for the simultaneous transfer of the image information from each frame buffer to the video display controller according to at least one data clock rate.

* * * * *